United States Patent [19]

Garwood et al.

[11] 4,211,640

[45] Jul. 8, 1980

[54] PROCESS FOR THE TREATMENT OF OLEFINIC GASOLINE

[75] Inventors: William E. Garwood, Haddonfield; Wooyoung Lee, Cherry Hill, both of N.J.

[73] Assignee: Mobil Oil Corporation, New York, N.Y.

[21] Appl. No.: 41,844

[22] Filed: May 24, 1979

[51] Int. Cl.$^2$ .............................................. C10G 25/04

[52] U.S. Cl. ..................................................... 208/255

[58] Field of Search ............................... 208/255, 307

[56] References Cited

U.S. PATENT DOCUMENTS

| | | | |
|---|---|---|---|
| 3,865,716 | 2/1975 | Sosnowski | 208/255 |
| 3,969,222 | 7/1976 | Hayes | 208/255 |
| 4,053,532 | 10/1977 | Ireland et al. | 208/307 |

*Primary Examiner*—George Crasanakis

*Attorney, Agent, or Firm*—Charles A. Huggett; Raymond W. Barclay

[57] ABSTRACT

A process is disclosed for the treatment of highly olefinic gasoline containing at least about 50% by weight of olefins by contacting said olefinic gasoline with a special group of acidic crystalline aluminosilicate zeolites, such as those of the ZSM-5 type in order to enhance the gum stability of said gasoline and produce products comprising both gasoline and fuel oil.

16 Claims, No Drawings

PROCESS FOR THE TREATMENT OF OLEFINIC GASOLINE

BACKGROUND OF THE INVENTION

This invention relates to the treatment of highly olefinic gasoline containing at least about 50% by weight of olefins by contacting said olefinic gasoline with a special group of acidic crystalline aluminosilicate zeolites, such as those of the ZSM-5 type in order to enhance to gum stability of said gasoline and produce products comprising both gasoline and fuel oil.

There are many processes known in the patent and technical literature which produce olefinic gasolines having an olefin content of at least 50 weight percent, such as U.S. Pat. No. 3,960,978. Thus, by way of illustration, fluid catalytic cracking processes produce a light olefin product stream which when charged over ZSM-5 as "wet" gas results in olefinic gasoline. The "wet" gas comes from a piece of equipment called an accumulator which is before the gas plant compressor. A more recent process resulting in the production of olefinic gasolines involves contacting synthesis gas over iron or cobalt ZSM-5 type compositions under certain conditions. This process is believed to go through a light olefin intermediate (*Journal of Catalysis,* Vol. 56, 274, 1979).

These olefinic gasolines have good unleaded research octane numbers of 90 and higher, but unfortunately also have poor gum stability. In addition, reaction constraints in both systems, i.e. the petroleum route and the synthesis gas route, limit the liquid product essentially to gasoline. In some situations, especially in those areas of the world that are short of petroleum, the synthesis gas route might be attractive and it would be advantageous to produce both gasoline and fuel oil products such as diesel fuel, home heating oils, jet fuel, etc.

DESCRIPTION OF THE PRIOR ART

It is to be specifically noted that the broad concept of contacting an olefinic charge with the special class of zeolites with which this invention is concerned is known in the art and is the subject of various United States patents. Thus, for example, U.S. Pat. No. 3,960,978 teaches conversion of olefins to olefinic gasolines. U.S. Pat. No. 4,021,502 discloses conversion of olefins over ZSM-12. U.S. Pat. No. 3,760,024 discloses contacting olefins with ZSM-5 type zeolites. U.S. Pat. No. 3,778,501 discloses preparation of aromatics by contacting olefins over ZSM-5 type catalysts. U.S. Pat. No. 3,827,968 discloses a two-step aromatization process wherein in the first step an olefin is contacted over a ZSM-5 type zeolite. U.S. Pat. No. 3,845,150 discloses contacting a feed comprising saturated and unsaturated compounds over a ZSM-5 type zeolite in order to form aromatics. U.S. Pat. No. 3,843,740 also discloses an aromatization process wherein various feed streams, including gasoline are contacted with ZSM-5 type zeolites. U.S. Pat. No. 3,756,942 discloses an aromatization process involving contact over ZSM-5 type catalysts of various feeds, including gasoline. However, none of the prior art is directed towards the concept of treating olefinic gasoline at relatively mild reaction conditions with a ZSM-5 type zeolite to yield reaction products comprising both fuel oil and gasoline, said gasoline having enhanced gum stability.

DESCRIPTION OF THE PREFERRED EMBODIMENTS

The novel process of this invention is directed towards contacting an olefinic gasoline containing at least about 50 weight percent of olefins with a special class of zeolites under very specific reaction conditions so as to selectively react olefins other than ethylene and produce both gasoline and fuel oil.

The acidic crystalline aluminosilicate utilized is characterized by a pore dimension greater than about 5 Angstroms, i.e. it is capable of sorbing paraffins having a single methyl branch as well as normal paraffins, and it has a silica-to-alumina ratio of at least 2.5. Zeolite A, for example, with a silica-to-alumina ratio of 2.0 is not useful in this invention, and it has no pore dimension greater than about 5 Angstroms.

The crystalline aluminosilicates herein referred to, also known as zeolites, constitute an unusual class of natural and synthetic minerals. They are characterized by having a rigid crystalline framework structure composed of an assembly of silicon and aluminum atoms, each surrounded by a tetrahedron of shared oxygen atoms, and a precisely defined pore structure. Exchangeable cations are present in the pores.

Zeolites useful for the crystalline aluminosilicate component of this invention include the acidic forms of: zeolite X, described in U.S. Pat. No. 2,882,244; zeolite Y, described in U.S. Pat. No. 3,130,007; mordenite; zeolite L, described in U.S. Pat. No. 3,216,789; zeolite T, described in U.S. Pat. No. 2,950,952; and zeolite beta, described in U.S. Pat. No. 3,308,069. The acidic crystalline aluminosilicate component should be in the hydrogen form, or it may be stabilized by ion exchange with rare earth or other metal cations.

The preferred zeolites useful in this invention are selected from a recently discovered novel class of zeolites with unusual properties. Although they have unusually low alumina contents, i.e. high silica-to-alumina ratios, they are very active even when the silica-to-alumina ratio exceeds 30. The activity is surprising since the alumina in the zeolite framework is believed responsible for catalytic activity. These catalysts retain their crystallinity for long periods in spite of the presence of steam at high temperature which induces irreversible collapse of the framework of other zeolites, e.g. of the X and A type. Furthermore, carbonaceous deposits, when formed, may be removed by burning at higher than usual temperatures to restore activity. Equally important, when used as the acidic crystalline aluminosilicate component in the process of this invention, catalytic activity is sustained for unusually long periods of time.

An important characteristic of the crystal structure of this preferred class of zeolites is that it provides constrained access to, and egress from, the intracrystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra. Briefly, the preferred acidic crystalline aluminosilicates useful in this invention possess, in combination: a silica-to-alumina ratio of at least about 12; and a structure providing constrained access to the intracrystalline free space.

The silica-to-alumina ratio referred to may be determined by conventional analysis. This ratio is meant to represent, as closely as possible, the ratio in the rigid anionic framework of the zeolite crystal and to exclude alumina in the binder or in cationic form within the channels. Although acidic crystalline aluminosilicates with a silica-to-alumina ratio of at least 12 are useful, it is preferred to use those having higher ratios of at least about 30. Such solids, after activation, acquire an intracrystalline sorption capacity for normal hexane which is greater than that for water, i.e. they exhibit "hydrophobic" properties. It is believed that this hydrophobic character is advantageous in the present invention.

The preferred crystalline aluminosilicates useful in this invention freely sorb normal hexane and have a pore dimension greater than about 5 Angstroms. In addition, the structure must provide constrained access to larger molecules. It is sometimes possible to judge from a known crystal structure whether such constrained access exists. For example, if the only pore windows in a crystal are formed by eight-membered rings or oxygen atoms, then access to molecules of larger cross-section than normal hexane is excluded and the zeolite is not of the desired type. Windows of ten-membered rings are preferred, although excessive puckering or pore blockage may render these catalysts ineffective. Twelve-membered rings do not generally appear to offer sufficient constraint to produce the advantageous selectivity, although structures can be conceived, due to pore blockage or other cause, that may be operative.

Rather than attempt to judge from crystal structure whether or not a zeolite possesses the necessary constrained access, a simple determination of the "constraint index" may be made by passing continuously a mixture of equal weight of normal hexane and 3-methylpentane over a small sample, approximately 1 gram or less, of catalyst at atmospheric pressure according to the following procedure. A sample of the catalyst, in the form of pellets or extrudate, is crushed to a particle size about that of coarse sand and mounted in a glass tube. Prior to testing, the catalyst is treated with a stream of air at 1000° F. for at least 15 minutes. The catalyst is then flushed with helium and the temperature adjusted between 550° F. and 950° F. to give an overall conversion between 10 and 60 percent. The mixture of hydrocarbons is passed at 1 liquid hourly space velocity (i.e. 1 volume of hydrocarbon per volume of catalyst per hour) over the catalyst with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "constraint index" is calculated as follows:

$$\text{Constraint Index} = \frac{\log_{10}(\text{fraction of n-hexane remaining})}{\log_{10}(\text{fraction of 3-methylpentane remaining})}$$

The constraint index approximates the ratio of the cracking rate constants for the two hydrocarbons. Catalysts suitable for the present invention are those having a constraint index from 1.0 to 12.0, preferably 2.0 to 7.0.

The preferred class of zeolites defined herein is exemplified by ZSM-5, ZSM-11, ZSM-12, ZSM-21, TEA mordenite and other similar materials. Recently issued U.S. Pat. No. 3,702,886 describing and claiming ZSM-5 is incorporated herein by reference.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

ZSM-21 is more particularly described in U.S. Application Ser. No. 358,192, filed May 7, 1973, the entire contents of which are incorporated herein by reference, which application has been abandoned in favor of U.S. Application Ser. Nos. 528,060 and 528,061, filed Nov. 29, 1974 directed to ZSM-38 and 35 respectively, the apparent component zeolites of ZSM-21, the entire contents of which are incorporated herein by reference. Ser. No. 528,061 has matured into U.S. Pat. No. 4,016,245. Serial No. 528,060 has been abandoned in favor of Ser. No. 560,412 which has matured into U.S. Pat. No. 4,046,859.

The specific preferred zeolites described, when prepared in the presence of organic cations, are catalytically inactive, possibly because of the intracrystalline free space is occupied by organic cations from the forming solution. They may be activated by heating in an inert atmosphere at 1000° F. for 1 hour, for example, followed by base exchange with ammonium salts followed by calcination at 1000° F. in air. The presence of organic cations in the forming solution may not be absolutely essential to the formation of this special type zeolite; however, the presence of these cations does appear to favor its formation. Regardless of preparation technique, it is desirable to activate this type zeolite by base exchange with ammonium salts followed by calcination in air at about 1000° F. for from about 15 minutes to about 24 hours.

Natural zeolites may sometimes be converted to this preferred type zeolite by various activation procedures and other treatments such as base exchange, steaming, alumina extraction and calcination, in combinations. Natural minerals which may be so treated include ferrierite, brewsterite, stillbite, dachiardite, epistilbite, heulandite, and clinoptilolite. The preferred crystalline aluminosilicates are ZSM-5, ZSM-11, ZSM-12, ZSM-21 and TEA mordenite, with ZSM-5 particularly preferred.

The preferred acidic crystalline aluminosilicates components are those having a crystal density, in the dry hydrogen form, of not substantially below about 1.6 grams per cubic centimeter. It has been found that zeolites which satisfy all three of these criteria are most desired. Therefore, the preferred zeolites are those having a constraint index as defined above of about 1 to 12, a silica-to-alumina ratio of at least about 12 and a dried crystal density of not less than about 1.6 grams per cubic centimeter. The dry density for known structures may be calculated from the number of silicon plus aluminum atoms per 1000 cubic Angstroms, as given, e.g. on page 11 of the article of Zeolite Structure by W. M. Meier. This paper, the entire contents of which are incorporated herein by reference, is included in "Proceedings of the Conference on Molecular Sieves," London, April 1967, published by the Society of Chemical Industry, London, 1968. When the crystal structure is unknown, the crystal framework density may be determined by classical pyknometer techniques. For example, it may be determined by immersing the dry hydrogen form of the zeolite in an organic solvent which is not sorbed by the crystal. It is possible that the unusual sustained activity and stability of this class of zeolites is associated with its high crystal anionic framework density of not less than about 1.6 grams per cubic centimeter. This high density, of course, must be associated with a relatively small amount of free space within the crystal, which might be expected to result in more stable structures. This free space, however, is important as the locus of catalytic activity.

The crystalline aluminosilicate of this invention in all cases should be acidic as evidenced by some degree of catalytic activity for cracking of normal hexane. The degree of acidity as evidenced in a hexane-cracking test which gives an alpha value of at least 10 and, more particularly, at least 100 is required. The alpha value is to be determined in accordance with the method set forth by P. B. Weisz and J. N. Miale in "Journal of Catalysis", Vol, 4, No. 4, August 1969, pp. 527–529, which description is herein incorporated by reference. The alpha value is determined before this component is formed into an intimate mixture with the carbon monoxide reducing component.

As has heretofore been stated, the broad concept of contacting olefins, including olefinic gasoline over the identical catalyst with which this invention is concerned is not per se novel. The entire key to the inventive concept of this invention resides in choosing a certain limited critical range of operating conditions such that the following three objectives will be accomplished:

(1) Gasoline having improved gum stability will be obtained;

(2) substantially no aromatics will be made, i.e. a net increase of less than 5 weight percent; and (3) the products obtained will comprise both fuel oil and gasoline.

The general operating parameters for carrying out the novel process of this invention can be defined by stating that the process is carried out at pressures from about 100 to 1000 psig, at temperatures ranging from 350° to 600° F., and at space velocities of 0.2 to 10 LHSV. It is to be immediately understood that the above recitation of ranges of pressure, space velocity, and temperature is not intended to mean that all operations within the above set forth limits will result in producing the desired results of the instant invention. On the contrary, what is meant by the above limits concerning temperature, pressure and space velocity is best expressed in a negative way. Operations outside the ranges specifically set forth will not result in the improved process of this invention. It is well known in the art that there is a correlation between temperature, pressure and space velocity with respect to the severity of a given chemical reaction. Quite simply put, the instant invention is concerned with conversion of the most active gum forming olefins to fuel oil (probably via polymerization) at a severity such that non-gum forming olefins, such as highly branched olefins are substantially unaffected. A net production of aromatics, i.e. greater than 5 weight percent, is contrary to the above objective.

One way of ascertaining whether or not the correct severity is being utilized is by reference to the $C_6+$liquid yield. In the novel process of this invention, the $C_6+$liquid yield of the product obtained should not be any more than 5 volume percent less than the $C_6+$liquid yield of the starting gasoline, i.e. it should be at least 95%.

Thus, by way of specific illustration, reference is made to Example 13 which describes the conversion of an olefinic gasoline over HZSM-5 at a pressure of 700 psig, a liquid hourly space velocity of 0.5 and at an average temperature of 554° F. As will be obvious, the temperature, pressure and space velocity of this example are within the broad ranges of pressure, temperature and space velocity previously set forth. However, it will be seen that the $C_6+$liquid yield in this example was 74.8 volume percent, whereas the $C_6+$liquid of the starting charge stock was 84.5 volume percent. Thus, the $C_6+$liquid yield of Example 13 was 11.5 volume percent less than the $C_6+$liquid yield of the charge stock. Therefore, the operations of this example are at a severity outside the scope of this invention. If one were desirous of operating at the pressure and temperature specified in Example 13, then one would have to increase the space velocity from 0.5 LHSV up to a point where the liquid yield obtained would be no more than 5 volume percent less than that of the charge stock. This is precisely because it is well known in the art that at a constant temperature and pressure increasing the space velocity decreases the severity of reaction. It is also known in the art that if the pressure and space velocity remain constant, then decreasing the temperature reduces the severity. Thus, again with specific reference to Example 13, as opposed to increasing the space velocity, the maximum temperature of this example should be decreased down to the point where the liquid yield obtained is no more than 5 volume percent less than the $C_6+$liquid yield of the charge stock.

Thus, it is not possible to define the operating parameters of this invention merely by reciting a range of temperatures, pressures and space velocities. It is also necessary to state that within the range of pressure, temperature and space velocity a severity must be achieved which results in the net production of no more than 5 weight percent aromatics or results in a $C_6+$liquid which is no more than 5 volume percent less than the charge.

EXAMPLE 1

Catalyst Preparation

The HZSM-5 zeolite catalyst used in the examples was prepared by mixing a dried as synthesized ZSM-5 zeolite having a silica/alumina ratio of about 70 with alumina and water, extruding into 1/16" diameter pellets. The extruded material contained 35 or 65 parts ZSM-5 per 65 or 35 parts alumina.

The dried extrudate was calcined for three hours at 538° C. in flowing nitrogen. After cooling, the extrudate was contacted with an ammonium nitrate exchange solution (about 0.3 lb $NH_4NO_3$/lb extrudate) for one hour at ambient temperature. This exchange was then repeated until the sodium level was less than 0.05 weight percent. The extrudate was then washed, dried and calcined in flowing air at 538° C. for three hours. The extrudate was then sized to 30–60 mesh.

EXAMPLE 2

A mixture of propylene/propane 63.5/36.5 weight percent was charged to a pilot plant over HZSM-5 extrudate catalyst containing 65% ZSM-5 at 150 psig, 1.9 LHSV (olefin), recycle ratio 4.2 mols/mol, reactor inlet temperature 476°–578° F., outlet 621°–693° F. for 7 days. Propylene conversion was 95%. The average $C_5+$octane number (R+O) for the 2–7 day period was 92, with $C_6+$composition as follows:

| | | |
|---|---|---|
| Paraffins, total | 8 | |
| Iso | | 6 |
| Normal | | 2 |
| Olefins | 90 | |
| Naphthenes | 1 | |
| Aromatics | 1 | |

EXAMPLES 3-7

The liquid product from Example 2, composed of 1% butenes, 7% pentenes, and 91% $C_6$+material, was charged over the extruded catalyst of Example 1 containing 35% ZSM-5 at 50-1000 psig, 450°-520° F., ~1 LHSV, for 4½ days.

The results obtained, as well as the actual experimental conditions are shown in the following table:

TABLE

| Example | | 3 | 4 | 5 | 6 | 7 |
|---|---|---|---|---|---|---|
| LHSV | CHARGE | 1.0 | 1.1 | 1.0 | 0.9 | 1.0 |
| WHSV | " | 1.2 | 1.4 | 1.2 | 1.2 | 1.3 |
| Temp., °F., Average | " | 449 | 504 | 504 | 507 | 505 |
| Maximum | " | 451 | 518 | 520 | 525 | 517 |
| Run Time, Hours | " | 24 | 22 | 23 | 17 | 20 |
| Accumulative Time, Days | " | 1.0 | 1.9 | 22.9 | 3.6 | 4.4 |
| Pressure, psig | " | 700 | 700 | 400 | 1000 | 50 |
| Liquid Product Gravity, °API | 61.9 | 55.0 | 52.1 | 52.8 | 53.1 | 59.9 |
| Yield, Wt. % | | | | | | |
| $C_1 + C_2$ | — | <0.1 | <0.1 | <0.1 | <0.1 | <0.1 |
| $C_3$ | 0.5 | 0.9 | 0.9 | 0.8 | 0.5 | 0.3 |
| $C_3=$ | <0.1 | <0.1 | <0.1 | <0.1 | <0.1 | <0.1 |
| i-$C_4$ | 0.1 | 0.3 | 0.5 | 0.4 | 0.3 | 0.2 |
| n-$C_4$ | 0.1 | 0.2 | 0.2 | 0.1 | 0.1 | 0.1 |
| $C_4=$ | 0.9 | 0.2 | 0.3 | 0.4 | 0.2 | 1.1 |
| i-$C_5$ | 0.6 | 1.0 | 1.8 | 1.3 | 1.2 | 0.7 |
| n-$C_5$ | 0.3 | 0.4 | 0.7 | 0.4 | 0.4 | 0.3 |
| $C_5=$ | 6.6 | 2.3 | 1.3 | 1.8 | 1.6 | 6.6 |
| $C_6+$ | 90.9 | 94.7 | 94.3 | 94.8 | 95.7 | 90.7 |
| | 100.0 | 100.0 | 100.0 | 100.0 | 100.0 | 100.0 |
| Liquid Product Boiling Range, °F. | | | | | | |
| 10% | 110 | 159 | 186 | 170 | 167 | 128 |
| 30 | 187 | 220 | 261 | 250 | 245 | 185 |
| 50 | 230 | 278 | 317 | 301 | 297 | 226 |
| 70 | 281 | 325 | 365 | 357 | 352 | 278 |
| 90 | 339 | 386 | 414 | 410 | 406 | 347 |
| 95 | 365 | 403 | 428 | 426 | 423 | 371 |
| 98 | 382 | 415 | 437 | 436 | 433 | 390 |
| % Boiling Above 330° F. | 12 | 28 | 44 | 39 | 38 | 13 |
| % Boiling Above 380° F. | 2 | 12 | 24 | 21 | 20 | 3 |
| O. N., R + O | — | 86.2 | — | — | — | 91.3 |

From the above table, it can be seen that pressures above about 50 psig are necessary to convert the charge to fuel oil product, but there is no advantage to going above about 700 psig, where the charge is already essentially all liquid phase.

Liquid products from Examples 4, 5 and 6 were composited and distilled, cut point 330° F. The 47 volume percent gasoline product boiling below 330° F. had the following properties:

| | | |
|---|---|---|
| Gravity, °API | 61.7 | |
| Specific | 0.7324 | |
| Boiling Range, °F. | | |
| 10% | 147 | |
| 20% | 189 | |
| 50% | 254 | |
| 70% | 284 | |
| 90% | 325 | |
| 95% | 344 | |
| 98% | 366 | |
| Composition, Wt. % | | |
| Paraffins, Total | 22 | |
| Iso | | 18 |
| Normal | | 4 |
| Olefins | 73 | |
| Naphthenes | 1 | |
| Aromatics | 4 | |
| Octane No. R + O | 92.4 | |

-continued

| | |
|---|---|
| The 53 Vol. % 330° F. + product had the following properties: | |
| Gravity, °API | 45.4 |
| Specific | 0.7999 |
| Boiling Range, °F. | |
| 10% | 334 |
| 20% | 361 |
| 50% | 421 |
| 70% | 469 |
| 90% | 558 |
| 95% | 611 |
| 98% | 662 |
| Pour Point, °F. | <-70 |
| Aniline No. °F. | 143.0 |
| Diesel Index | 65 |
| Mol. Wt., Est. | 180 |
| Bromine No. | 86.9 |
| Calc. Double Bonds/Molecule | 1.0 |
| Hydrogen, Wt. % | 13.63 |
| Carbon, Wt. % | 85.04 |
| H/C Ratio | 1.91 |

It can be seen that the gasoline product contained considerably less olefins than the charge, more isoparaffins and aromatics, and about the same octane No. The 330° F.+ fuel oil has very low pour point, high diesel index, and analyses indicating it to be essentially all aliphatic olefins.

It is to be specifically noted that the above data illustrates that substantially no net production of aromatics has occurred even though the gasoline fraction contained more aromatics than the charge. Thus, for example, the charge had an aromatic content of about 1 weight percent, i.e. see Example 2; whereas the gasoline fraction had an aromatic content of 4%. However, the gasoline fraction is only 47 volume percent of the total liquid product so that it would have an aromatic content of 2.13% due to the concentration factor alone (1%×100/47). Thus, the aromatic production was no more than about 2% by weight.

EXAMPLE 8

This example will illustrate the flexibility which is offered by the novel process of this invention in connection with the subsequent treatments which can be given to the 330° F.+ fuel oil products.

A portion of the 330° F.+ product (101.5 g) from Examples 4–6 was hydrogenated in a stirring autoclave using Girdler G-49B Ni catalyst (4.1 g), 500 psig hydrogen, 350°–375° F., over a three hour period repressuring with hydrogen until no further pressure drop. The hydrogenated product had the following properties:

| | |
|---|---|
| Gravity, °API | 48.2 |
| Specific | 0.7874 |
| Boiling Range, °F. | |
| 10% | 329 |
| 20% | 354 |
| 50% | 413 |
| 70% | 455 |
| 90% | 508 |
| 95% | 526 |
| 98% | 540 |
| Pour Point, °F. | <−100 |
| Freezing Point, °F. | <−65 |
| Aniline No. °F. | 179.5 |
| Aniline-Gravity Product | 86,500 |
| BTU/lb (1) | 18,847 |
| Mol. Wt., est. | 180 |
| Hydrogen, wt. % | 14.98 |
| Carbon, wt. % | 85.23 |
| H/C Ratio | 2.09 |
| Smoke Point | 37 |
| Luminometer No. (2) | >80 |

(1) Estimated from aniline-gravity product, ASTM D-1405
(2) Estimated from smoke point, ASTM D-1740

This material is an excellent premium jet fuel, exceeding JP-7 specifications in freezing point (max. −46° F.), BTU/lb (Min. 18,700), and luminometer No. (Min. 75). The overall properties indicate it is highly isoparaffinic

EXAMPLE 9

A mixture of propylene/isobutene/propane/n-butane/isobutane, 35/22/16/6/21 wt. %, was charged to a pilot plant over HZSM-5 extrudate catalyst at 50 psig, 1.2 LHSV (olefin), no gas recycle, reactor inlet temperature 514° F., outlet 541° F. for 2½ days. Propylene conversion of 2–2½ days was 91%, butene 51%, and $C_5$+octane No. (R+O) 91.3. $C_6$+composition was as follows:

| | | |
|---|---|---|
| Paraffins, Total | 34 | |
| Iso | | 29 |
| Normal | | 5 |
| Olefins | 55 | |
| Naphthenes | 2 | |
| Aromatics | 9 | |

This liquid product was tested for gum stability by ASTM Test D-873, 5 hours, using an additive package consisting of 15 lbs antioxidant (2,6-ditert. butyl p-cresol) and 5 lbs metal deactivator (N,N'-disalicylidene-1,2-propane diamine) per 1000 bbl. Potential gum was high, 300 mg/100 ml. A good result is considered to be 10 mg/100 ml.

EXAMPLES 10–14

The liquid product from Example 9, composed of 1% propane, 7% $C_4$'s, 7.5% $C_5$'s and 84.5% $C_6$+, was charged over the extruded catalyst of Example 1 containing 65% ZSM-5 at 400–700 psig, 500°–550° F., 0.5–3 LHSV, for 3 days.

The actual operating conditions, as well as the results obtained are shown in the following table:

TABLE

| Example | CHARGE | 10 | 11 | 12 | 13 | 14 |
|---|---|---|---|---|---|---|
| LHSV | " | 0.6 | 1.1 | 0.4 | 0.5 | 2.0 |
| WHSV | " | 0.9 | 1.5 | 0.6 | 0.7 | 2.7 |
| Temp., °F., Average | " | 506 | 507 | 507 | 554 | 552 |
| Maximum | " | 518 | 515 | 519 | 570 | 557 |
| Run Time, Hours | " | 18 | 6½ | 16 | 24 | 2 |
| Accumulative Time, Days | " | 0.8 | 1.0 | 1.7 | 2.7 | 2.8 |
| Pressure, psig | " | ← 400 | → | ← | 700 | → |
| Liquid Pressure Gravity, °API | 56.4 | 43.7 | 44.7 | 45.8 | 43.2 | 43.1 |
| Yield, Wt. % | | | | | | |
| $C_1 + C_2$ | <0.1 | <0.1 | <0.1 | <0.1 | <0.1 | <0.1 |
| $C_3$ | 0.7 | 1.4 | 1.3 | 1.1 | 2.5 | 1.8 |
| $C_3=$ | <0.1 | <0.1 | 0.1 | <0.1 | <0.1 | <0.1 |
| i-$C_4$ | 4.1 | 6.6 | 6.6 | 7.0 | 8.6 | 8.5 |
| n-$C_4$ | 2.1 | 2.7 | 2.7 | 2.9 | 4.2 | 2.9 |
| $C_4=$ | 1.1 | 0.3 | 0.4 | 0.3 | 0.4 | 0.5 |
| i-$C_5$ | 1.8 | 4.2 | 4.0 | 4.7 | 6.5 | 4.5 |
| n-$C_5$ | 0.8 | 1.3 | 1.0 | 1.3 | 2.6 | 1.3 |
| $C_5=$ | 4.9 | 0.4 | 0.5 | 0.5 | 0.4 | 0.4 |
| $C_6$+ | 84.5 | 83.1 | 83.4 | 82.2 | 74.8 | 80.1 |
| | 100.0 | 100.0 | 100.0 | 100.0 | 100.0 | 100.0 |
| Liquid Product Boiling Range, °F. | | | | | | |
| 10% | 114 | 158 | 142 | 147 | 134 | 171 |
| 30 | 209 | 261 | 248 | 254 | 243 | 263 |
| 50 | 269 | 319 | 309 | 313 | 312 | 324 |
| 70 | 312 | 377 | 382 | 368 | 401 | 412 |
| 90 | 376 | 469 | 477 | 456 | 530 | 527 |
| 95 | 404 | 496 | 504 | 485 | 570 | — |
| 98 | 429 | 511 | — | 500 | — | — |
| % Boiling Above 330° F. | 22 | 43 | 42 | 41 | 44 | 48 |

TABLE-continued

| Example | CHARGE | 10 | 11 | 12 | 13 | 14 |
|---|---|---|---|---|---|---|
| % Boiling Above 380° F. | 9 | 30 | 36 | 28 | 34 | 37 |

From the above table, it can be seen that Examples 10, 11, 12 and 14 all resulted in successful operation as witnessed from the fact that the $C_6+$liquid fraction of these examples was no more than 5% by volume less than the liquid fraction of the charge. Example 13, however, was run at a severity which is simply too high. Note that this example obtained a $C_6+$liquid yield of 74.8 volume percent which is 11.5 volume percent less than the charge. Also note that in this example, the $C_5$ total yield was higher than the $C_5$ total of the charge. The above results with Example 13 indicate that significant cracking took place as opposed to the polymerization of high gum forming olefins.

All of the liquid products from Examples 10–14 were composited and distilled cut point 330° F. The 45.5 volume percent gasoline product boiling below 330° F. had the following properties:

| | | |
|---|---|---|
| Gravity, °API | 63.0 | |
| Specific | 0.7275 | |
| Boiling Range, °F. | | |
| 10% | 124 | |
| 20% | 144 | |
| 50% | 229 | |
| 70% | 275 | |
| 90% | 311 | |
| 95% | 323 | |
| 98% | 339 | |
| Octane No. R + O | ~80 | |
| Potential gum, mg/100 ml | 3 | |
| $C_6+$ Composition, wt. % | | |
| Paraffins, Total | 67 | |
| Iso | | 59 |
| Normal | | 8 |
| Olefins | 12 | |
| Naphthenes | 6 | |
| Aromatics | 15 | |

The 54.5 Vol. % 330° F.+ product had the following properties:

| | |
|---|---|
| Gravity, °API | 30.7 |
| Specific | 0.8724 |
| Boiling Range, °F. | |
| 10% | 321 |
| 20% | 344 |
| 50% | 401 |
| 70% | 443 |
| 90% | 485 |
| 95% | 494 |
| 98% | 500 |
| Pour Point, °F. | <100 |
| Aniline No. °F. | 93.4 |
| Diesel Index | 29 |

It can be seen that gasoline gum, using the same additive package used for the charge (Example 9) was very good, 3 mg/100 ml. Research octane No. was lower, due to the high concentration of paraffins which are not believed to be highly branched.

It is again to be specifically noted that the above results also demonstrate that there is substantially no net increase in aromatics even though the aromatics are concentrated in the gasoline fraction. Thus, for example, the charge material had an aromatic content of 9 weight percent (Example 9). The gasoline fraction had an aromatic content of 15 weight percent. However, the gasoline fraction only represented 45.5 volume percent such that by concentration effects alone ($9\times100/45.5$) the aromatics content would have been 19.78 weight percent.

It is also to be specifically noted that the combined liquid product of Examples 10, 11, 12, 13 and 14 meet the aforementioned criteria with respect to the $C_6+$liquid yield even though Example 13 does not; thus adding up the $C_6+$liquid yield of Examples 10, 11, 12, 13 and 14. It can be seen that it averages to 80.72 volume percent which is less than 5 volume percent by weight of the $C_6+$liquid product of the charge.

What is claimed is:

1. In the process of contacting olefinic gasoline with an acidic crystalline aluminosilicate zeolite having a pore diameter greater than about 5 Angstroms, a silica-to-alumina ratio of at least 12, and a constraint index within the range of 1–12 at elevated temperatures, the improvement which comprises utilizing an olefinic gasoline having an olefin content of at least 50 weight percent and (a) carrying out said contact at a temperature of from about 350°–600° F., a pressure of from about 100–1,000 psig and at a space velocity ranging from about 0.2 to 10 LHSV; (b) said temperature, space velocity and pressure being chosen so as to produce no more than 5 weight percent of aromatics, and (c) obtaining a product comprising both fuel oil and gasoline having enhanced gum stability.

2. The process of claim 1 wherein the aromatics produced are less than 5 weight percent.

3. The process of claim 1 wherein the $C_6+$liquid fraction of the product is no more than 5 volume percent less than the $C_6+$liquid fraction of said olefinic gasoline charge.

4. The process of claim 2 wherein the $C_6+$liquid fraction of the product is no more than 5 volume percent less than the $C_6+$liquid fraction of said olefinic gasoline charge.

5. The process of claim 1 wherein a ZSM-5 type zeolite is used.

6. The process of claim 2 wherein a ZSM-5 type zeolite is used.

7. The process of claim 3 wherein a ZSM-5 type zeolite is used.

8. The process of claim 4 wherein a ZSM-5 type zeolite is used.

9. The process of claim 5 wherein the zeolite is ZSM-5.

10. The process of claim 6 wherein the zeolite is ZSM-5.

11. The process of claim 7 wherein the zeolite is ZSM-5.

12. The process of claim 8 wherein the zeolite is ZSM-5.

13. The process of claim 5 wherein the zeolite is ZSM-11.

14. The process of claim 6 wherein the zeolite is ZSM-11.

15. The process of claim 7 wherein the zeolite is ZSM-11.

16. The process of claim 8 wherein the zeolite is ZSM-11.

* * * * *